(12) United States Patent
Eguro

(10) Patent No.: US 7,977,440 B2
(45) Date of Patent: Jul. 12, 2011

(54) OPTICAL ELEMENT AND OPTICAL PICKUP APPARATUS

(75) Inventor: Yayoi Eguro, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 132 days.

(21) Appl. No.: 12/482,037

(22) Filed: Jun. 10, 2009

(65) Prior Publication Data

US 2009/0312510 A1 Dec. 17, 2009

(30) Foreign Application Priority Data

Jun. 13, 2008 (JP) ................................. 2008-155046
Jul. 25, 2008 (JP) ................................. 2008-192241

(51) Int. Cl.
*C08F 232/08* (2006.01)
*B29D 11/00* (2006.01)
*G11B 7/00* (2006.01)
*C08F 232/04* (2006.01)

(52) U.S. Cl. ....... 526/281; 264/1.32; 264/1.33; 264/2.6; 369/112.23

(58) Field of Classification Search .................. 264/1.32, 264/1.33, 2.6; 369/112.23; 526/281
See application file for complete search history.

(56) References Cited

FOREIGN PATENT DOCUMENTS

| JP | 2002-105131 | | 4/2002 |
|---|---|---|---|
| JP | 2005-306009 | * | 11/2005 |
| JP | 2006-143927 | * | 6/2006 |

OTHER PUBLICATIONS

Machine Translation of JP 2005-306009; publication date: Nov. 2005.*
Machine Translation of JP 2006-143927; publication date: Jun. 2006.*

* cited by examiner

*Primary Examiner* — Fred M Teskin
(74) *Attorney, Agent, or Firm* — Finnegan, Henderson, Farabow, Garrett & Dunner, L.L.P.

(57) ABSTRACT

A production method of an objective lens for optical pickup apparatus having a numerical aperture NA of image side of 0.80 to 0.90 is disclosed. The method includes steps of molding resin composition containing copolymer of α-olefin and a cyclic olefin represented by Formula (I) or (II) to form lens shape, and thermally processing the molded product under a condition at a temperature between Tg −45° C. and Tg −15° C. for 12 to 168 hours, wherein the Formula (I) and (II) is detailed in the specification.

20 Claims, 1 Drawing Sheet

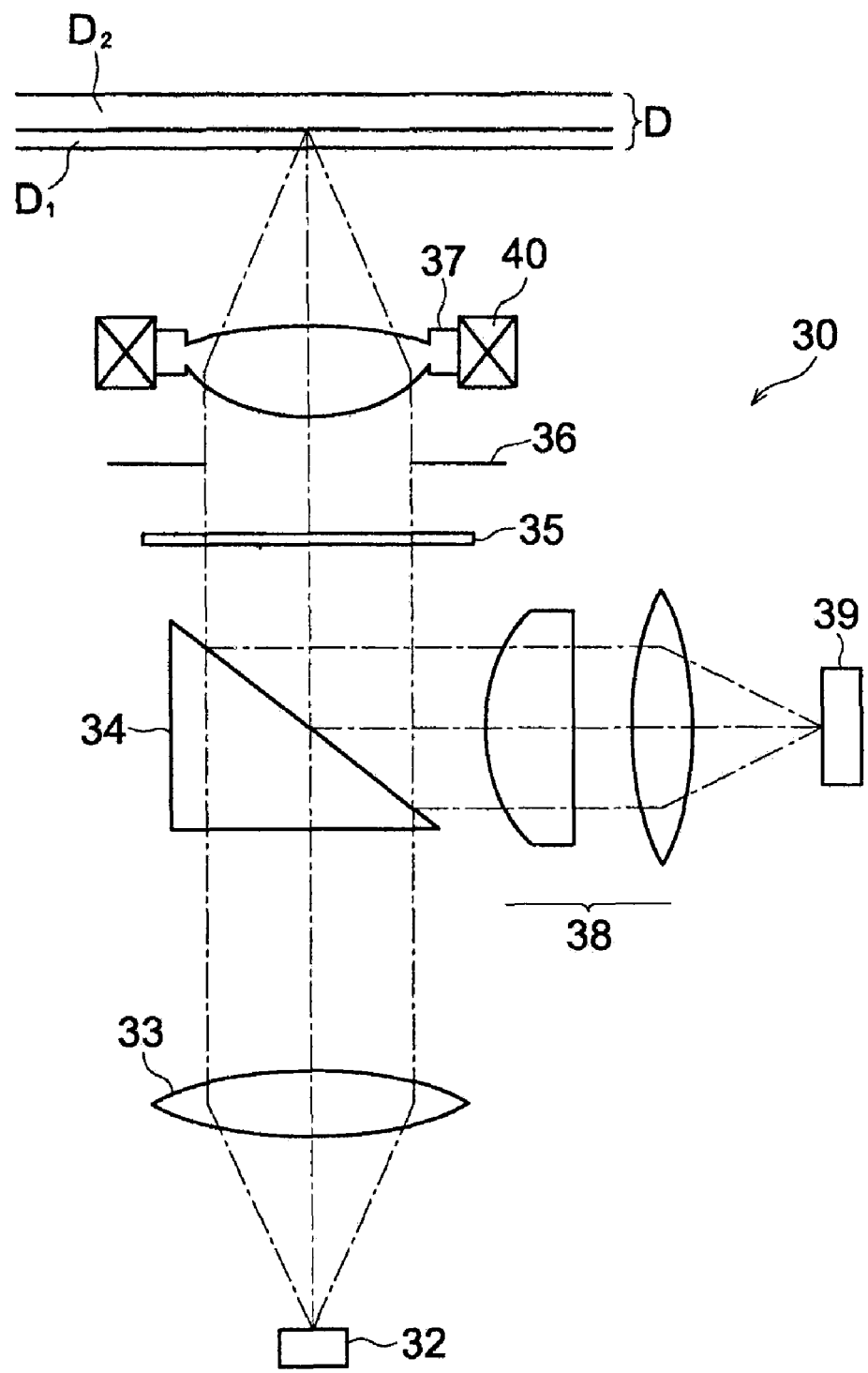

OPTICAL ELEMENT AND OPTICAL PICKUP APPARATUS

This application is based on Japanese Patent Application Nos. 2008-155046 filed on Jun. 13, 2008 and 2008-192241 filed on Jul. 25, 2008 in Japanese Patent Office, the entire content of which is hereby incorporated by reference.

TECHNICAL FIELD

The present invention relates to a production method of an objective lens used for an optical pickup apparatus, an objective lens used for an optical pickup apparatus and an optical pickup apparatus.

BACKGROUND

Apparatus reading and recording information such as players, recorders and drives for an optical information recording media, for example, MO, CD, or DVD, include an optical pick up device. The optical pick up devices have an optical unit which exposes light having predetermined wavelength to the medium and accepts the reflected light by a detecting element, and the optical units have an optical element such as an objective lens which condensing the light flux at a reflective layer of the recording media or accepting elements. Plastic materials are suitably used for the optical elements of the optical pickup lens in view of low cost production by such as injection molding. Copolymers composed of cyclic olefin and α-cyclic olefin are known for the suitably applicable the optical element. (For example, Patent Document 1)

Blu-Ray Disc ("BD") recording apparatus or media recording or reproducing information employs an objective lens having a numerical aperture NA of image side of 0.80 to 0.90, representatively 0.85, and light source having wave length of 380 to 420 nm (usually 405 nm) have been developed which can record information with higher density than CD (NA: 0.45, wavelength: 780 nm) or DVD (NA: 0.65, wavelength: 635 or 650 nm).

Patent Document 1: JP A 2002-105131

A spot beam can be made small in the optical pickup apparatus for BD use shorter wave length and having larger NA than the optical pickup lens for conventional CD or DVD, and realize high recording density. On the other point of view, high sensitivity and strict optical performance are required. Light stability different from the conventional optical pickup lens is required adapted for shorter wave length of light source, and higher level of stability performance used at high temperature is required, and therefore, it is not responsible to proper stability against light or heat of the resin material. Very high accuracy as well as high stability are required because it is exposed to strict temperature condition due to heat of driving device such as tracking in addition to high stability against light, particularly for an objective lens which condense the light flux to the recording media. The inventors have found that the deterioration of lens performance is caused by stress relaxation at high temperature and resin deterioration due to blue laser of wavelength of 280 to 420 nm in complex as a result of study for stability performance against light and durability performance.

In view of foregoing, an object of the present invention is to provide a production method of an objective lens used for an optical pickup apparatus, an objective lens used for an optical pickup apparatus and an optical pickup apparatus in which the durability and deterioration of aberration are improved.

SUMMARY OF THE INVENTION

A production method of an objective lens for optical pickup apparatus having numerical aperture NA of image side of 0.80 to 0.90, comprises steps of molding resin composition containing copolymer of α-olefin and a cyclic olefin represented by Formula (I) or (II) to form lens shape, and thermally processing the molded product under a condition at a temperature between Tg −45° C. and Tg −15° C. for 12 to 168 hours.

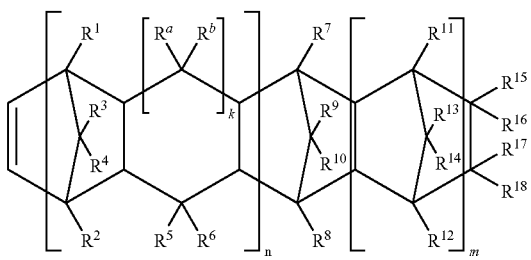

(I)

In the formula, n is 0 or 1, m is 0 or a positive integer, and k is 0 or 1. In the case where k is 1, the ring that is shown using k has 6 member rings, while the ring has 5 member rings when k is 0.

$R^1$ to $R^{18}$ and $R^a$ and $R^b$ independently represent a hydrogen atom, a halogen atom or a hydrocarbon group. The halogen atom herein represents a fluorine atom, a chlorine atom, a bromine atom or an iodine atom.

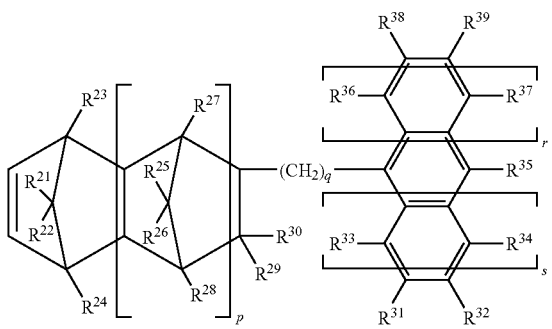

(II)

In the formula (II), p and q independently represent 0 or a positive integer and r and s independently represent 0, 1 or 2. $R^{21}$ to $R^{39}$ independently represent a hydrogen atom, a halogen atom, a hydrocarbon group or an alkoxy group.

An objective lens produced by a method of this invention can be free from composition causing deterioration due to heat and have improved stability against light due to blue laser radiation by processing under a condition at a temperature between Tg −45° C. and Tg −15° C. for 12 to 168 hours.

BRIEF DESCRIPTION OF THE DRAWINGS

The FIGURE shows a schematic structure of the optical pickup apparatus.

DETAILED DESCRIPTION OF THE PREFERRED EMBODIMENT

The preferred embodiment according to the present invention is described in detail.

The objective lens has numerical aperture NA of image side of 0.85, and is composed of a copolymer of α-olefin and a cyclic olefin represented by Formula (I) or (II). The lens is subjected to thermally processing under a condition at a temperature between Tg −45° C. and Tg −15° C. for 12 to 168 hours. The condition is determined to maintain aberration variation of 0.01 rms λ or less, required for good characteristics for the objective lens.

Composition material of the objective lens is described.

The composition material of the objective lens includes a copolymer of α-olefin and a cyclic olefin represented by Formula (I) or (II)

The cyclical olefin is preferably represented by the following general formula (I) or (II).

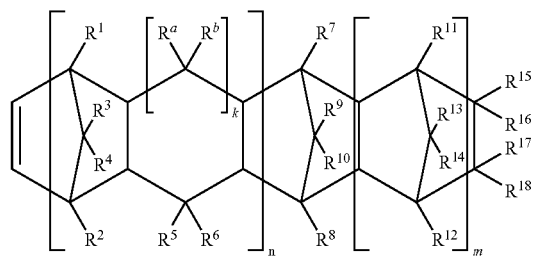
(I)

In the formula, n is 0 or 1, m is 0 or a positive integer, and k is 0 or 1. In the case where k is 1, the ring that is shown using k has 6 member rings, while the ring has 5 member rings when k is 0.

$R^1$ to $R^{18}$ and $R^a$ and $R^b$ independently represent a hydrogen atom, a halogen atom or a hydrocarbon group. The halogen atom herein represents a fluorine atom, a chlorine atom, a bromine atom or an iodine atom.

Examples of the hydrocarbon group include an alkyl group having 1-20 carbon atoms, a halogenated alkyl group having 1-20 carbon atoms, a cycloalkyl group or an aromatic hydrocarbon group having 3-15 carbon atoms. More specifically, examples of the alkyl group include a methyl group, an ethyl group, a propyl group, an isopropyl group, an amyl group, a hexyl group, an octyl group, a decyl group, a dodecyl group and an octadecyl group. These alkyl groups may be substituted by a halogen atom.

An example of the cycloalkyl group is cyclohexyl. Examples of the aromatic hydrocarbon include a phenyl group, a naphthyl group. In addition in the general formula (I), $R^{15}$ and $R^{16}$, $R^{17}$ and $R^{18}$, $R^{15}$ and $R^{17}$, $R^{16}$ and $R^{18}$, $R^{15}$ and $R^{18}$ or $R^{16}$ and $R^{17}$, may each bond (with each other) and form a monocyclic or polycyclic group, and the monocyclic or polycyclic group formed in this manner may have double bonds. Specific examples of the monocyclic or polycyclic group formed herein are given below.

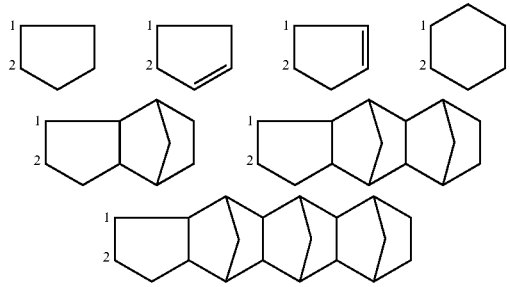

The carbon atoms that have been numbered 1 or 2 in the above example represent carbon atoms that bond with $R^{15}$ ($R^{16}$) or $R^{17}$ ($R^{18}$) respectively of the general formula (I).

Also an alkylidene group may also be formed with $R^{15}$ and $R^{16}$ or $R^{17}$ and $R^{18}$. This type of alkylidene group has 2-20 carbon atoms and specific examples of this type of alkylidene group include an ethylidene group, a propylidene group and an isopropylidene group.

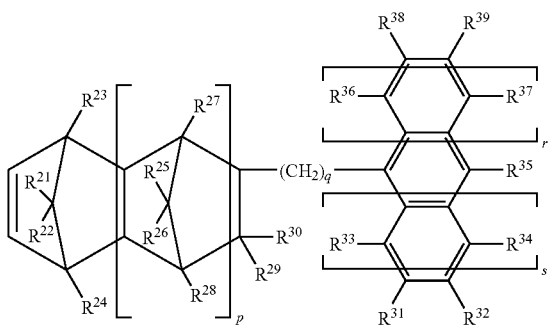

In the formula (II), p and q independently represent 0 or a positive integer and r and s independently represent 0, 1 or 2. $R^{21}$ to $R^{39}$ independently represent a hydrogen atom, a halogen atom, a hydrocarbon group or an alkoxy group.

The halogen atom herein is the same as the halogen atom in general formula (I). Examples of the hydrocarbon include an alkyl group having 1 to 20 carbon atoms, a cycloalkyl group or an aromatic hydrocarbon having 3-15 carbon atoms. More specifically, examples of the alkyl group include a methyl group, an ethyl group, a propyl group, an isopropyl group, an amyl group, a hexyl group, an octyl group, a decyl group, a dodecyl group and an octadecyl group. These alkyl groups may be substituted by a halogen atom.

An example of the cycloalkyl group is a cyclohexyl group. Examples of the aromatic hydrocarbon include an aryl group and an aralkyl group, and more specifically, a phenyl group, a tolyl group, a naphthyl group, a benzyl group and a phenylethyl group.

Examples of the alkoxy group include a methoxy group, an ethoxy group and a propoxy group. The carbon atoms which bonds with $R^{29}$ and $R^{30}$, the carbon atom which bonds with $R^{33}$ and the carbon atom which bonds with $R^{31}$ may bond together directly or via a alkylene group having 1-3 carbon atoms. In the case where the two carbon atoms are bonded together via an alkylene group, $R^{29}$ and $R^{33}$ or $R^{30}$ and $R^{31}$ together with each other form one of alkylene groups which are the methylene group (—$CH_2$—), ethylene group (—$CH_2CH_2$—) or propylene group (—$CH_2CH_2CH_2$—).

$R^{35}$ and $R^{32}$ or $R^{35}$ and $R^{39}$ may bond to each other to form a monocyclic or polycyclic aromatic ring when r=s=0. More specifically, when r=s=0, examples of the aromatic ring which is formed from $R^{35}$ and $R^{32}$ include the following.

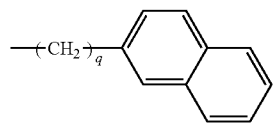

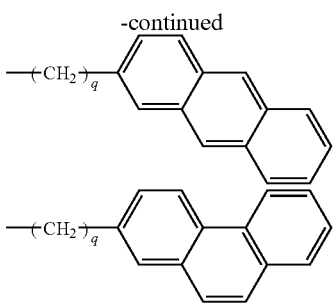

Herein q is the same as in the general formula (II).

Specific examples of the cyclic olefins shown in the general formula (I) and the general formula (II) above include bicyclo-2-heptene derivatives (bicyclohept-2-ene derivatives), tricyclo-3-decene derivatives, tricyclo-3-undecene derivatives, tetracyclo-3-dodecene derivatives, pentacyclo-4-pentadecene derivatives, pentacyclopentadecadiene derivatives, pentacyclo-3-pentadecene derivatives, pentacyclo-3-hexadecene derivatives, pentacyclo-4-hexadecene derivatives, hexacyclo-4-heptadecene derivatives, heptacyclo-5-eicocene derivatives, heptacyclo-4-eicocene derivatives, heptacyclo-5-heneicocene derivatives, octacyclo-5-docecene, nonacyclo-5-pentacocene, nonacyclo-6-hexacocene derivatives, cyclopentadiene-acenapthtylene addition compounds, 1,4-metano-1,4,4a,9a-tetrahydrofluorene derivatives and 1,4-metano-1,4,4a,5,10,10a-hexahydroantracene derivatives.

More specific examples of the cyclic olefins represented by the general formula (I) and general formula (II) above are shown below.

Bicyclo[2.2.1]hept-2-ene derivatives such as:
1 bicyclo[2.2.1]hept-2-ene,
2 6-methyl bicyclo[2.2.1]hept-2-ene,
3 5,6-dimethyl bicyclo[2.2.1]hept-2-ene,
4 1-methyl bicyclo[2.2.1]hept-2-ene,
5 6-ethyl bicyclo[2.2.1]hept-2-ene,
6 6-n-butyl bicyclo[2.2.1]hept-2-ene,
7 6-isobutyl bicyclo[2.2.1]hept-2-ene,
8 7-methyl bicyclo[2.2.1]hept-2-ene.

Tetracyclo[4.4.0.1$^{2.5}$.1$^{7.10}$]-3-dodecene derivatives such as:
9 tetracyclo[4.4.0.1$^{2.5}$.1$^{7.10}$]-3-dodecene,
10 8-methyl tetracyclo[4.4.0.1$^{2.5}$.1$^{7.10}$]-3-dodecene,
11 8-ethyl tetracyclo[4.4.0.1$^{2.5}$.1$^{7.10}$]-3-dodecene,
12 8-propyl tetracyclo[4.4.0.1$^{2.5}$.1$^{7.10}$]-3-dodecene,
13 8-butyl tetracyclo[4.4.0.1$^{2.5}$.1$^{7.10}$]-3-dodecene,
14 8-isobutyl tetracyclo[4.4.0.1$^{2.5}$.1$^{7.10}$]-3-dodecene,
15 8-hexyl tetracyclo[4.4.0.1$^{2.5}$.1$^{7.10}$]-3-dodecene,
16 8-cyclohexyl tetracyclo[4.4.0.1$^{2.5}$.1$^{7.10}$]-3-dodecene,
17 8-stearyl tetracyclo[4.4.0.1$^{2.5}$.1$^{7.10}$]-3-dodecene,
18 5,10-dimethyl tetracyclo[4.4.0.1$^{2.5}$.1$^{7.10}$]-3-dodecene,
19 2,10-dimethyl tetracyclo[4.4.0.1$^{2.5}$.1$^{7.10}$]-3-dodecene,
20 8,9-dimethyl tetracyclo[4.4.0.1$^{2.5}$.1$^{7.10}$]-3-dodecene,
21 8-ethyl-9-methyl tetracyclo[4.4.0.1$^{2.5}$.1$^{7.10}$]-3-dodecene,
22 11,12-dimethyl tetracyclo[4.4.0.1$^{2.5}$.1$^{7.10}$]-3-dodecene,
23 2,7,9-trimethyl tetracyclo[4.4.0.1$^{2.5}$.1$^{7.10}$]-3-dodecene,
24 9-ethyl-2,7-dimethyl tetracyclo[4.4.0.1$^{2.5}$.1$^{7.10}$]-3-dodecene,
25 9-isobutyl-2,7-dimethyl tetracyclo[4.4.0.1$^{2.5}$.1$^{7.10}$]-3-dodecene,
26 9,11,12-trimethyl tetracyclo[4.4.0.1$^{2.5}$.1$^{7.10}$]-3-dodecene,
27 9-ethyl-11,12-dimethyl tetracyclo[4.4.0.1$^{2.5}$.1$^{7.10}$]-3-dodecene,
28 9-isobutyl-11,12-dimethyl tetracyclo[4.4.0.1$^{2.5}$.1$^{7.10}$]-3-dodecene,
29 5,8,9,10-tetramethyl tetracyclo[4.4.0.1$^{2.5}$.1$^{7.10}$]-3-dodecene,
30 8-ethylidene tetracyclo[4.4.0.1$^{2.5}$.1$^{7.10}$]-3-dodecene,
31 8-ethylidene-9-methyl tetracyclo[4.4.0.1$^{2.5}$.1$^{7.10}$]-3-dodecene,
32 8-ethylidene-9-ethyl tetracyclo[4.4.0.1$^{2.5}$.1$^{7.10}$]-3-dodecene,
33 8-ethylidene-9-isopropyl tetracyclo[4.4.0.1$^{2.5}$.1$^{7.10}$]-3-dodecene,
34 8-ethylidene-9-butyl tetracyclo[4.4.0.1$^{2.5}$.1$^{7.10}$]-3-dodecene,
35 8-n-propylidene tetracyclo[4.4.0.1$^{2.5}$.1$^{7.10}$]-3-dodecene,
36 8-n-propylidene-9-methyl tetracyclo[4.4.0.1$^{2.5}$.1$^{7.10}$]-3-dodecene,
37 8-n-propylidene-9-ethyl tetracyclo[4.4.0.1$^{2.5}$.1$^{7.10}$]-3-dodecene,
38 8-n-propylidene-9-isopropyl tetracyclo[4.4.0.1$^{2.5}$.1$^{7.10}$]-3-dodecene,
39 8-n-propylidene-9-butyl tetracyclo[4.4.0.1$^{2.5}$.1$^{7.10}$]-3-dodecene,
40 8-isopropylidene tetracyclo[4.4.0.1$^{2.5}$.1$^{7.10}$]-3-dodecene,
41 8-isopropylidene-9-methyl tetracyclo[4.4.0.1$^{2.5}$.1$^{7.10}$]-3-dodecene,
42 8-isopropylidene-9-ethyl tetracyclo[4.4.0.1$^{2.5}$.1$^{7.10}$]-3-dodecene,
43 8-isopropylidene-9-isopropyl tetracyclo[4.4.0.1$^{2.5}$.1$^{7.10}$]-3-dodecene,
44 8-isopropylidene-9-butyl tetracyclo[4.4.0.1$^{2.5}$.1$^{7.10}$]-3-dodecene,
45 8-chloro tetracyclo[4.4.0.1$^{2.5}$.1$^{7.10}$]-3-dodecene,
46 8-bromo tetracyclo[4.4.0.1$^{2.5}$.1$^{7.10}$]-3-dodecene,
47 8-fluoro tetracyclo[4.4.0.1$^{2.5}$.1$^{7.10}$]-3-dodecene,
48 8,9 dichloro tetracyclo[4.4.0.1$^{2.5}$.1$^{7.10}$]-3-dodecene.

Hexacyclo[6.6.1.1$^{3.6}$.1$^{10.13}$.0$^{2.7}$.0$^{9.14}$]-4-heptadecen derivatives such as:
49 hexacyclo[6.6.1.1$^{3.6}$.1$^{10.13}$.0$^{2.7}$.0$^{9.14}$]-4-heptadecen,
50 12-methyl hexacyclo[6.6.1.1$^{3.6}$.1$^{10.13}$.0$^{2.7}$.0$^{9.14}$]-4-heptadecen,
51 12-ethyl hexacyclo[6.6.1.1$^{3.6}$.1$^{10.13}$.0$^{2.7}$.0$^{9.14}$]-4-heptadecen,
52 12-isobutyl hexacyclo[6.6.1.1$^{3.6}$.1$^{10.13}$.0$^{2.7}$.0$^{9.14}$]-4-heptadecen,
53 1,6,10-trimethyl-12-isobutylhexacyclo[6.6.1.1$^{3.6}$.1$^{10.13}$.0$^{2.7}$.0$^{9.14}$]-4-heptadecen.

Octacyclo[8.8.0.1$^{2.9}$.1$^{4.7}$.1$^{11.18}$.1$^{13.16}$.0$^{3.8}$.0$^{12.17}$]-5-docecene derivatives such as:
54 octacyclo[8.8.0.1$^{2.9}$.1$^{4.7}$.1$^{11.18}$.1$^{13.16}$.0$^{3.8}$.0$^{12.17}$]-5-docecene,
55 15-methyl octacyclo[8.8.0.1$^{2.9}$.1$^{4.7}$.1$^{11.18}$.1$^{13.16}$.0$^{3.8}$.0$^{12.17}$]-5-dococene,
56 15-ethyl octacyclo[8.8.0.1$^{2.9}$.1$^{4.7}$.1$^{11.18}$.1$^{13.16}$.0$^{3.8}$.0$^{12.17}$]-5-dococene.

Pentacyclo[6.6.1.1$^{3.6}$.0$^{2.7}$.0$^{9.14}$]-4-hexadecene derivatives such as:
57 pentacyclo[6.6.1.1$^{3.6}$.0$^{2.7}$.0$^{9.14}$]-4-hexadecene,
58 1,3-dimethyl pentacyclo[6.6.1.1$^{3.6}$.0$^{2.7}$.0$^{9.14}$]-4-hexadecene,
59 1,6-dimethyl pentacyclo[6.6.1.1$^{3.6}$.0$^{2.7}$.0$^{9.14}$]-4-hexadecene,
60 15,16-dimethyl pentacyclo[6.6.1.1$^{3.6}$.0$^{2.7}$.0$^{9.14}$]-4-hexadecene.

Heptacyclo-5-eicocene derivatives or heptacyclo-5-heneicocene derivatives such as:
61 heptacyclo[8.7.0.1$^{2.9}$.1$^{4.7}$.1$^{11.17}$.0$^{3.8}$.0$^{12.16}$]-5-eicocene,
62 heptacyclo[8.8.0.1$^{2.9}$.1$^{4.7}$.1$^{11.18}$.0$^{3.8}$.0$^{12.17}$]-5-heneicocene.
Tricyclo[4.3.0.1$^{2.5}$]-3-decene derivatives such as:
63 tricyclo[4.3.0.1$^{2.5}$]-3-decene,
64 2-methyl tricycle[4.3.0.1$^{2.5}$]-3-decene,
65 5-methyl tricycle[4.3.0.1$^{2.5}$]-3-decene.
Tricyclo[4.4.0.1$^{2.5}$]-3-undecene derivatives such as:
66 tricycle[4.4.0.1$^{2.5}$]-3-undecene,
67 10-methyl tricycle[4.4.0.1$^{2.5}$]-3-undecene.
Pentacyclo[6.5.1.1$^{3.6}$.0$^{2.7}$.0$^{9.13}$]-4-pentadecene derivatives such as:
68 pentacyclo[6.5.1.1$^{3.6}$.0$^{2.7}$.0$^{9.13}$]-4-pentadecene,
69 1,3 dimethyl pentacyclo[6.5.1.1$^{3.6}$.0$^{2.7}$.0$^{9.13}$]-4-pentadecene,
70 1,6 dimethyl pentacyclo[6.5.1.1$^{3.6}$.0$^{2.7}$.0$^{9.13}$]-4-pentadecene,
71 14,15 dimethyl pentacyclo[6.5.1.1$^{3.6}$.0$^{2.7}$.0$^{9.13}$]-4-pentadecene.
Diene compounds such as:
72 pentacyclo[6.5.1.1$^{3.6}$.0$^{2.7}$.0$^{9.13}$]-4,10-pentadecadiene.
Pentacyclo[7.4.0.1$^{2.5}$.1$^{9.12}$.0$^{8.13}$]-3-pentadecene derivatives such as:
73 pentacyclo[7.4.0.1$^{2.5}$.1$^{9.12}$.0$^{8.13}$]-3-pentadecene,
74 methyl substituted pentacyclo[7.4.0.1$^{2.5}$.1$^{9.12}$.0$^{8.13}$]-3-pentadecene
Heptacyclo[8.7.0.1$^{3.6}$.1$^{10.17}$.1$^{12.15}$.0$^{2.7}$.0$^{11.16}$]-4-eicocene derivatives such as:
75 heptacyclo[8.7.0.1$^{3.6}$.1$^{10.17}$.1$^{12.15}$.0$^{2.7}$.0$^{11.16}$]-4-eicocene,
76 dimethyl substituted heptacyclo[8.7.0.1$^{3.6}$.1$^{10.17}$.1$^{12.15}$.0$^{2.7}$.0$^{11.16}$]-4-eicocene.
Nonacyclo[10.9.1.1$^{4.7}$.1$^{13.20}$.1$^{15.18}$.0$^{3.8}$.0$^{2.10}$.0$^{12.21}$.0$^{14.19}$]-5-pentacocene derivatives such as:
77 nonacyclo[10.9.1.1$^{4.7}$.1$^{13.20}$.1$^{15.18}$.0$^{3.8}$.0$^{2.10}$.0$^{12.21}$.0$^{14.19}$]-5-pentacocene,
78 trimethyl substituted nonacyclo[10.9.1.1$^{4.7}$.1$^{13.20}$.1$^{15.18}$.0$^{3.8}$.0$^{2.10}$.0$^{12.21}$.0$^{14.19}$]-5-pentacocene.
Pentacyclo[8.4.0.1$^{2.5}$.1$^{9.12}$.0$^{8.13}$]-3-hexadecene derivatives such as:
79 pentacyclo[8.4.0.1$^{2.5}$.1$^{9.12}$.0$^{8.13}$]-3-hexadecene,
80 11-methyl-pentacyclo[8.4.0.1$^{2.5}$.1$^{9.12}$.0$^{8.13}$]-3-hexadecene,
81 11-ethyl-pentacyclo[8.4.0.1$^{2.5}$.1$^{9.12}$.0$^{8.13}$]-3-hexadecene,
82 10,11-dimethyl-pentacyclo[8.4.0.1$^{2.5}$.1$^{9.12}$.0$^{8.13}$]-3-hexadecene.
Heptacyclo[8.8.0.1$^{4.7}$.1$^{11.18}$.1$^{13.16}$.0$^{3.8}$.0$^{12.17}$]-5-heneicocene derivatives such as:
83 heptacyclo[8.8.0.1$^{4.7}$.1$^{11.18}$.1$^{13.16}$.0$^{3.8}$.0$^{12.17}$]-5-heneicocene,
84 15-methyl-heptacyclo[8.8.0.1$^{4.7}$.1$^{11.18}$.1$^{13.16}$.0$^{3.8}$.0$^{12.17}$]-5-heneicocene,
85 trimethyl-heptacyclo[8.8.0.1$^{4.7}$.1$^{11.18}$.1$^{13.16}$.0$^{3.8}$.0$^{12.17}$]-5-heneicocene.
Nonacyclo[10.10.1.1$^{5.8}$.1$^{14.21}$.1$^{16.19}$.0$^{2.11}$.0$^{4.9}$.0$^{13.22}$.0$^{15.20}$]-5-hexacocene derivatives such as:
86 nonacyclo[10.10.1.1$^{5.8}$.1$^{14.21}$.1$^{16.19}$.0$^{2.11}$.0$^{4.9}$.0$^{13.22}$.0$^{15.20}$]-5-hexacocene.

Other examples include:
87 5-phenyl-bicyclo[2.2.1]hept-2-ene,
88 5-methyl-5-phenyl-bicyclo[2.2.1]hept-2-ene,
89 5-benzyl-bicyclo[2.2.1]hept-2-ene,
90 5-tolyl-bicyclo[2.2.1]hept-2-ene,
91 5-(ethylphenyl)-bicyclo[2.2.1]hept-2-ene,
92 5-(isopropylphenyl)-bicyclo[2.2.1]hept-2-ene,
93 5-(biphenyl)-bicyclo[2.2.1]hept-2-ene,
94 5-(β-naphthyl)-bicyclo[2.2.1]hept-2-ene,
95 5-(α-naphthyl)-bicyclo[2.2.1]hept-2-ene,
96 5-(antracenyl)-bicyclo[2.2.1]hept-2-ene,
97 5,6-(diphenyl)-bicyclo[2.2.1]hept-2-ene,
98 cyclopentadiene-acenaphtylene addition compounds,
99 1,4-methano-1,4,4a,9a-tetrahydrofluorene,
100 1,4-methano-1,4,4a,5,10,10a-hexahydroanthracene,
101 8-phenyl-tetracyclo[4.4.0.0$^{3.5}$.1$^{7.10}$]-3-dodecene,
102 8-methyl-8-phenyl-tetracyclo[4.4.0.0$^{3.5}$.1$^{7.10}$]-3-dodecene,
103 8-benzyl-tetracyclo[4.4.0.0$^{3.5}$.1$^{7.10}$]-3-dodecene,
104 8-tolyl-tetracyclo[4.4.0.0$^{3.5}$.1$^{7.10}$]-3-dodecene,
105 8-(ethylphenyl)-tetracyclo[4.4.0.0$^{3.5}$.1$^{7.10}$]-3-dodecene,
106 8-(isopropylphenyl)-tetracyclo[4.4.0.0$^{3.5}$.1$^{7.10}$]-3-dodecene,
107 8,9-diphenyl-tetracyclo[4.4.0.0$^{2.5}$.1$^{7.10}$]-3-dodecene,
108 8-(biphenyl)-tetracyclo[4.4.0.0$^{2.5}$.1$^{7.10}$]-3-dodecene,
109 8-(β-naphthyl)-tetracyclo[4.4.0.0$^{2.5}$.1$^{7.10}$]-3-dodecene,
110 8-(α-naphthyl)-tetracyclo[4.4.0.0$^{2.5}$.1$^{7.10}$]-3-dodecene,
111 8-(antracenyl)-tetracyclo[4.4.0.0$^{2.5}$.1$^{7.10}$]-3-dodecene,
112 addition compounds in which cyclopentadiene is further added to (cyclopentadiene-acenaphthylene addition compounds),
113 11,12-benzo-pentacyclo[6.5.1.1$^{3.6}$.0$^{2.7}$.0$^{9.13}$]-4-pentadecene,
114 11,12-benzo-pentacyclo[6.5.1.1$^{3.6}$.0$^{2.7}$.0$^{9.13}$]-4-hexadecene,
115 11-phenyl-hexacyclo[6.6.1.1$^{3.6}$.1$^{10.13}$.0$^{2.7}$.0$^{9.14}$]-4-pentadecene,
116 14,15-benzo-heptacyclo[8.7.0.1$^{2.9}$.1$^{4.7}$.1$^{11.17}$.0$^{3.8}$.0$^{12.16}$]-5-eicocene.

Cyclic polyolefin represented by Formula (I) is preferably employed. Tetracyclo[4.4.0.1$^{2.5}$.1$^{7.10}$]-3-dodecene derivatives are preferable and tetracyclo[4.4.0.1$^{2.5}$.1$^{7.10}$]-3-dodecene is particularly preferable.

α-Olefin

In addition, examples of the α-olefin that forms the copolymer include straight chain α-olefins such as ethylene, propylene, 1-butene, 1-pentene, 1-hexene, 1-octene, 1-decene, 1-dodecene, 1-tetradecene, 1-hexadecene, 1-octadecene and 1-eicocene; branched chain α-olefins such as 4-methyl-1-pentene, 3-methyl-1-pentene and 3-methyl-1-butene. α-olefins having 2-20 carbon atoms are preferable. The straight chain and branched chain olefins may be substituted with a substitution group, and may be used singly or in combinations of two or more.

The various substitution groups are not particularly limited and typical examples include alkyl, aryl, anilino, acylamino, sulfonamide, alkylthio, arylthio, alkenyl, cycloalkyl, cycloalkenyl, alkinyl, heterocycle, alkoxy, aryloxy, heterocyclic oxy, siloxy, amino, alkylamino, imido, ureido, sulfamoylamino, alkoxycarbonylamino aryloxycarbonylamino, alkoxycarbonyl, aryloxycarbonyl, heterocyclicthio, thioureido, hydroxyl and mercapto groups, as well as spiro compound residues, bridged hydrocarbon compound residues, sulfonyl, sulfinyl, sulfonyloxy, sulfamoyl, phosphoryl, carbamoyl, acyl, acyloxy, oxycarbonyl, carboxyl, cyano, nitro, halogen substituted alkoxy, halogen substituted aryloxy, pyrrolyl, tetrazolyl groups and halogen atoms and the like.

The alkyl group preferably has 1-32 carbon atoms, and may be straight chain or branched. The aryl group is preferably a phenyl group.

Examples of the acylamino group include an alkylcarbonylamino group and an arylcarbonylamino group. Examples of the sulfonamide group include an alkylsulfonylamino group, an arylsulfonylamino group. Examples of the alkyl component and aryl component in the alkylthio group and the arylthio group include the alkyl groups and aryl groups above.

The alkenyl group preferably has 2-23 carbon atoms, and the cycloalkyl group preferably has 3-12 carbon atoms and a group with 5-7 carbon atoms is particularly preferable and the alkenyl group may be a straight or branched chain. The cycloalkenyl group preferably has 3-12 carbon atoms and a group with 5-7 carbon atoms is particularly preferable.

Examples of the ureido group include an alkyl ureido group, an aryl ureido group. Examples of the sulfamoyl amino group include an alkyl sulfamoyl amino group and an aryl sulfamoyl amino group. The heterocyclic group preferably has 5-7 members and specific examples include 2-furyl, 2-thienyl, 2-pyrimidinyl, 2-benzothiazolyl and the like. The saturated heterocyclic ring preferably has 5-7 members, and specific examples include tetrahydropyranyl, tetrahydrothiopyranyl and the like. The heterocyclic oxy group preferably has a heterocyclic ring having 5-7 members and specific examples include 3,4,5,6-tetrahydropyranyl-2-oxy, 1-phenyltetrazole-5-oxy and the like. The heterocyclic thio group preferably has 5-7 members and examples include 2-pyridyl thio, 2-benzothiazorylthio and 2,4-diphenoxy-1,3,5-triazole-6-thio. Examples of the siloxy group include trimethylsiloxy, triethylsiloxy and dimethylbutylsiloxy. Examples of the imide group include imide succinate, 3-heptadecyl imide succinate, phthalimide, glutarimide and the like. Examples of the spiro compound residue include spiro [3.3]heptane-1-yl and the like. Examples of the bridged hydrocarbon compound residue include bicyclo[2.2.1]heptan-1-yl, tricyclo [3.3.1.13.7]decan-1-yl, and 7,7-dimethyl-bicyclo[2.2.1]heptan-1-yl and the like.

Examples of the sulfonyl group include an alkylsulfonyl group, an arylsulfonyl group, a halogen substituted alkyl sulfonyl group, a halogen substituted aryl sulfonyl group and the like. Examples of the sulfinyl group include an alkyl sulfinyl group, an aryl sulfinyl group and the like. Examples of the sulfonyloxy group include an alkyl sulfonyl oxy group, an aryl sulfonyl oxy group and the like. Examples of the sulfamoyl group include an N,N-dialkyl sulfamoyl group, an N,N-diaryl sulfamoyl group, an N-alkyl-N-aryl sulfamoyl group and the like. Examples of the phosphoryl group include an alkoxy phosphoryl group, an aryloxy phosphoryl group, an alkyl phosphoryl group, an aryl phosphoryl group and the like. Examples of the carbamoyl group include an N,N-dialkyl carbamoyl group, N,N-diaryl carbamoyl group, an N-alkyl-N-aryl carbamoyl group and the like. Examples of the acyl group include an alkyl carbonyl group, an aryl carbonyl group and the like. Examples of the acyloxy group include an alkylcarbonyloxy group and the like. Examples of the oxycarbonyl group include an alkoxy carbonyl group, an aryloxy carbonyl group and the like. Examples of the halogen substituted alkoxy group include an α-halogen substituted alkoxy group. Examples of the halogen substituted aryloxy group include a tetrafluoroaryloxy group, a pentafluoraryloxy group and the like. Examples of the pyrrolyl group include 1-pyrrolyl and the like. Examples of the tetrazolyl group include 1-tetrazolyl and the like.

Aside from the above substitution groups, groups such as trifluoromethyl, heptafluoro-i-propyl, nonylfluoro-t-butyl, and a tetrafluoroaryl group, a pentafluoroaryl group and the like may be preferably used. In addition, the substitution groups may be substituted by other substitution groups.

In view of formability, the content of α-olefin monomer in the copolymer according to the present invention is preferable 20 weight % or more, and is more preferably between 25% and 90% and still more preferably between 30% and 85%.

The glass transition temperature (Tg) of the copolymer in this invention is preferably in the range of 80-250° C., and more preferably 90-220° C., and most preferably 100-200° C. The number average molecular weight (Mn) preferably in the range of 10,000-1,000,000, more preferably 20,000-500,000 and most preferably 50,000-300,000 with a polystyrene conversion value measured by gel permeation chromatography (GPC). When the molecular weight distribution is shown by the ratio (Mw/Mn) of Mn and the weight average molecular weight Mw with the polystyrene conversion value measured in the same manner by GPC, it is preferably 2.0 or less.

When Mw/Mn is too large, the mechanical strength and the thermal stability of the body formed are reduced. In order to increase mechanical strength in particular, and thermal stability and formation processing properties, Mw/Mn is preferably 1.8 or less and 1.6 or less is particularly preferable.

The temperature at the time of polymerization is preferably selected from the range 0 to 200° C. and more preferably 50 to 150° C., and the pressure is selected from the range of atmospheric pressure to 100 atmospheres. The molecular weight of the polymer formed can be easily adjusted by including hydrogen in the polymer band.

The olefin resin in this invention can be obtained from a market or synthesized by conventionally known polymerization methods.

The olefin resin in this invention may be a polymer synthesized from a single component cyclic monomer, but is preferably a cyclic monomer having two components or more, or a copolymer synthesized from a cyclic monomer and a non-cyclic monomer. The polymer may be formed using monomers having 1000 components or more, but is preferable that the monomer mixture has 10 components or less in view of production efficiency and polymer stability. Five components or less is further more preferable.

The copolymer obtained may be a crystalline polymer or a non-crystalline polymer, but a non-crystalline polymer is preferable.

The copolymer is preferably subjected to hydrogen addition treatment. Known methods may be used for the method of hydrogen addition of the carbon-unsaturated carbon bond (including an aromatic ring) of the polymer and copolymer in this invention, but of these, it is preferable to perform the hydrogen addition reaction using a catalyst including at least one metal selected from nickel, cobalt, iron, titanium, rhodium, palladium, platinum, ruthenium, and rhenium in an organic solvent in order to improve the hydrogen addition ratio and to reduce the polymer chain breaking reaction that occurs simultaneously with the hydrogen addition reaction. A heterogeneous catalyst or a homogenous catalyst may be used as the hydrogenation catalyst. The homogenous catalysts may simply be a metal or metal compound or may be carried by a carrier. Examples of the carrier include active carbon, silica, alumina, calcium carbide, titania, magnesia, zirconia, diatomaceous earth, silicon carbide and the like, and the amount of the catalyst carrier which is the amount of metal to the total weight amount of catalyst is normally in the range of 0.01-80 weight % and more preferably 0.05-60 weight %. The homogenous catalyst may be a catalyst in which nickel, cobalt, titanium or an iron compound is combined with an organic metal compound (such as an organic aluminum compound and an organic lithium compound), or an organic metal complex catalyst such as rhodium, palladium, platinum, ruthenium, and rhenium. These hydrogenation catalysts may be used singly or in combinations of two or more, and the amount used is usually 0.01-100 parts by weight and more preferably 0.05-50 parts by weight, and still more preferably 0.1-30 parts by weight for 100 parts by weight of the copolymer.

The temperature of the hydrogen addition reaction is usually 0 to 300° C., and preferably room temperature to 250° C., and 50 to 200° C. is particularly preferable.

The hydrogen pressure is usually 0.1 MPa to 30 MPa, and preferably 1 MPa to 20 MPa, and still more preferably 2 MPa to 15 MPa. The hydrogen addition ratio of the obtained hydrogen additive is usually 90% or more, more preferably 95% or more, and still more preferably 97% or more when measured by 1H-NMR, in view of thermal stability and weather stability. If the hydrogen addition ratio is low, the optical properties such as transparency, low birefringence and heat stability of the obtained polymer will be reduced.

The solvent used in the hydrogen addition reaction of the polymer and copolymer according to the present invention can be any type provided that it dissolves the polymer and copolymer according to the present invention and the solvent itself is not subjected to hydrogen addition, and examples include ethers such as tetrahydrofuran, diethyl ether, dibutyl ether, dimethoxy ethane; aromatic hydrocarbons such as benzene, toluene, xylene, ethyl benzene and the like; aliphatic hydrocarbons such as pentane, hexane, heptane and the like, aliphatic cyclic hydrocarbons such as cyclopentane, cyclohexane, methyl cyclohexane, dimethyl cyclohexane, decalin and the like; halogenated hydrocarbons such as methylene dichloride, dichloroethane, dichloroethylene, tetrachloroethane, chlorobenzene, trichlorobenzene and the like, and these may be used in combinations of two or more.

The hydrogen addition treatment of the copolymer may be conducted by separating the hydrogen additive of the polymer or copolymer from the polymer solution and then re-dissolving in a solvent, but the method may also be used in which the hydrogen addition reaction is performed by adding the hydrogen addition catalyst without performing separation.

After the hydrogen addition reaction is complete, the hydrogen addition catalyst remaining in the polymer is removed. Examples of removing methods include an absorption method using an absorption agent; an extraction method in which an organic acid such as lactic acid and the like and a poor solvent and water are added to a solution of a good solvent and the system is subjected to extraction and removal at room temperature or at increased temperature; and a washing method in which washing is done after a solution of a good solvent or a polymer slurry is subjected to contact treatment with a basic compound such as trimethylene diamine, aniline, pyridine, or ethane diamide in the environment of a gas such as nitrogen or hydrogen, or contact treatment is done with an acidic compound such as acetic acid, citric acid, benzoic acid, hydrochloric acid, and the like after contact treatment or at the same time as contact treatment.

The hydrogenation treated polymer is collected from the hydrogen addition liquid of the copolymer. Examples of collecting methods include those such as a filtration method in which the reaction solution is extracted from the poor solvent while stirring and the hydrogenated polymer coagulates; a centrifuge separation method; and a decantation method, as well a steam stripping method in which the reaction solution is blown into steam and the hydrogenated polymer is concentrated, and a direct removal method in which the solvent is directly removed from the reaction solution by heating and the like.

When the hydrogen addition reaction according to the present invention is used, a hydrogen addition rate of 90% or more is easily achieved, and a rate of 95% or more and 99% or more in particular is possible, and the obtained polymer or hydrogenated copolymer is not easily oxidized and thus an excellent polymer or hydrogenated copolymer is formed.

Additives

<Hindered Amine Light Stabilizer>

The light stabilizer used in the present invention will be described.

The hindered amine light stabilizers are preferably employed from the viewpoint of the transparency and the anti-coloring ability of the lens. Among the hindered amine light stabilizer, hereinafter referred to as HALS, ones having a Mn measured by GPC using tetrahydrofuran (THF) and converted into polystyrene of from 1,000 to 10,000, particularly from 2,000 to 5,000, and especially from 2,800 to 3,800, are preferable. When the Mn is too small, the designated amount of the HALS is difficultly added by the reason of evaporation thereof on the occasion of the addition of the HALS into the block-copolymer by heating, meting and kneading, or the processing suitability of the composite material is lowered so that a bubble and a silver streak are formed on the occasion of the forming by heating and melting. Furthermore, the volatile ingredient is formed in a gas state when the lens is used for long time while the light source lamp lights. When the Mn is too large, the dispersibility of the HALS in the block copolymer is lowered so that the transparency of the lens is decreased and the improving effect on the light stabilization is lowered. Therefore, the lens superior in the processing stability, low gas formation and transparency can be obtained by making the Mn of the HALS into the above range.

Concrete examples of the HALS include a high molecular weight HALS composed by combining plural piperidine rings through triazine skeletons such as N,N',N'',N'''-tetrakis-[4,6-bis-{butyl-(N-methyl-2,2,6,6-tetramethylpiperidine-4-yl)amino}-triazine-2-yl]-4,7-diazadecane-1,10-diamine, a polycondensation product of dibutylamine, 1,3,5-triazine and N,N'-bis(2,2,6,6-teramethyl-4-piperidyl)butylamine, poly[{(1,1,3,3-tetramethylbutyl)amino-1,3,5-triazine-2,4-di-yl}{(2,2,6,6-tetramethyl-4-piperidyl)imino}hexamethylene{(2,2,6,6-tetramethyl-4-piperidyl)imino}], a polycondensation product of 1,6-hexanediamine-N,N'-bis(2,2,6,6-tetramethyl-4-piperidyl) and morpholine-2,4,6-trichloro-1,3,5-triazine, and poly[(6-morpholino-s-triazine-2,4-di-yl)(2,2,6,6-tetramethyl-4-piperidyl)imino]-hexamethylene-(2,2,6,6-tetramethyl-4-piperidyl)imino]; a high molecular weight composed by combining piperidine rings through ester bonds such as a polymer of dimethyl succinate and 4-hydroxy(2,2,6,6-tetramethyl-1-piperidineethanol, a mixed ester of 1,2,3,4-butenetetracarboxylic acid, 1,2,2,6,6-pentamethyl-4-piperidinol and 3,9-bis(2-hydroxy-1,1-dimethylethyl)-2,4,8,10-tetraoxaspiro[5,5]undecane, and bis-[2,2,6,6-tetramethyl-4-piperidinyl]sebacate.

Among them, ones having a Mn of from 2,000 to 5,000 such as the polycondensation product of dibutylamine, 1,3,5-triazine and N,N'-bis(2,2,6,6-tetramethyl-4-piperidyl)butylamine, poly[(6-morpholino-s-triazine-2,4-di-yl)(2,2,6,6-tetramethyl-4-piperidyl)imino]-hexamethylene-(2,2,6,6-tetramethyl-4-piperidyl)imino] and the polymer of dimethyl succinate, 4-hydroxy(2,2,6,6-tetramethyl-1-piperidineethanol, and bis-[2,2,6,6-tetramethyl-4-piperidinyl]sebacate are preferable.

The adding amount of the above-compounds to the resin composition is preferably from 0.01 to 20, more preferably from 0.02 to 15, and particularly preferably from 0.05 to 10, by weight to 100 parts by weight of the polymer. When the adding amount is too small, the satisfactory improving effect in the light resistivity can not be obtained so that the coloring of the lens is caused during use for long period at out of door. When the adding amount of the HALS is excessively large, a part of it causes gas and the dispersing ability in the resin is lowered so that the transparency of the lens is decreased.

As a light stabilizer, a benzophenone light stabilizer and a benzotriazole light stabilizer may be employed in addition to the HALS in a range where the effects of the invention are not compromised.

When preparing the resin composition or during the molding process for the resin composition, various additives (called blending agents) may be added according to need. The additives used are not particularly limited, and examples include stabilizers such as antioxidants, thermal stabilizers, light stabilizers, weather stabilizers, ultraviolet light absorbers, and near infrared light absorbers; resin improving agents such as lubricants and plasticizers; colorants such as dyes and pigments; antistatic agents, flame retardants and fillers These blending agents may be used singly or in combinations of two or more, and may be suitably selected in a range where the effects of the invention are not compromised.

The anti-oxidant, that is a representative additive, is described.

<Antioxidant>

As the antioxidant, a phenol antioxidant, a phosphorus antioxidant and a sulfur antioxidant are usable and the phenol antioxidant, particularly an alkyl-substituted phenol antioxidant, is preferable. BY the addition of such the antioxidants, coloring and strength lowering of the lens caused oxidation on the occasion of the lens formation can be prevented without lowering in the transparency and the resistivity against heat. These antioxidants may be employed singly or in combination of two or more of them. Though the adding amount of the antioxidant may be optionally decided within the range in which the effects of the present invention are not disturbed, the amount is preferably 0.001 to 5, and more preferably from 0.01 to 1, parts by weight to 100 parts by weight of the polymer.

Phenol antioxidants can be employed. Examples of the phenol antioxidant include acrylate compounds described in JP A S63-179953 and JP A H01-168643 such as 2-t-butyl-6-(3-t-butyl-2-hydroxy-5-methylbenzyl)-4-methylphenyl acrylate and 2,4-di-t-amyl-6-(1-(3,5-di-t-amyl-2-hydroxyphenyl)ethyl)phenyl acrylate; alkyl-substituted phenol compounds such as octadecyl-3-(3,5-di-t-butyl-4-hydroxyphenyl propionate, 2,2'-methylene-bis(4-methyl-6-t-butylphenol), 1,1,3-tris(2-methyl-4-hydroxy-5-t-butylphenyl) butane, 1,3,5-trimethyl-2,4,6-tris(3,5-di-t-butyl-4-hydroxybenzyl)benzene, tetrakis(methylene-3-(3',5'-di-t-butyl-4'-hydroxyphenyl propionate)methane, pentaerythrimethyl-tetrakis(3-(3,5-di-t-butyl-4-hydroxyphenyl propionate)) and triethylene glycol-bis(3-(3-t-butyl-4-hydroxy-5-methylphenyl)propionate; and triazine group-containing phenol compounds such as 6-(4-hydroxy-3,5-di-t-butylanilino)-2,4-bisoctylthio-1,3,5-triazine, 4-bisoctylthio-1,3,5-triazine and 2-octylthio-4,6-bis(3,5-di-t-butyl-4-oxyanilino)-1,3,5-triazine.

The phosphorus antioxidants usually employed in the resin industry are usable. Examples of the phosphorus antioxidant include monophosphites such as triphenyl phosphite, diphenyl isodecyl phosphite, phenyl diisodecyl phosphite, tris(nonylphenyl)phosphite, tris(dinonylphenyl)phosphite, tris(2,4-di-t-butylphenyl) phosphite and 10-(3,5-di-t-butyl-4-hydroxybenzyl)-9,10-dihydro-9-oxa-10-phosphaphenathlene-10-oxide; and diphosphites such as 4,4'-butylidene-bis(3-methyl-6-t-butylphenyl-di-tridecyl phosphite) and 4,4'-isopropylidene-bis(phenyl-di-alkyl (C12 to C15) phosphite. Among them the monophosphites particularly tris(nonylphenyl) phosphite, tris(dinonyl-phenyl)phosphite and tris(2,4-di-t-butylphenyl) phosphite, are preferable.

Examples of the sulfur antioxidant include dilauryl 3,3-thiodipropionate, dimyristyl 3,3'-thiodipropionate, distearyl 3,3-thiodipropionate, lauryl stearyl 3,3-thiodipropionate, pentaerythritol-tetrakis-(β-lauryl-thiopropionate) and 3,9-bis(2-dodecylthioethyl)-2,4,8,10-tetraoxaspiro[5,5]undecane.

Occurrence of white turbid of the lens during for long period under high temperature and high humid condition can be prevented without degradation in the transparency, heat resistivity and mechanical strength by employing other additives.

The resin composition is allowed to contain an additive such as (1) a soft polymer, (2) an alcoholic compound or (3) organic or inorganic filler. By adding such the additives, occurrence of white turbid caused by standing for a long period under a high temperature and high humidity condition can be prevented without degradation in properties such as the transparency, low moisture absorption and mechanical strength.

Among the above-mentioned, (1) the soft polymer and (2) the alcoholic compound are excellent in the white turbid preventing effect and the transparency of the resin composition.

(1) Soft Polymer

The soft polymer to be employed in the invention is usually a polymer having a Tg of not more than 30° C. When the polymer shows plural Tgs, it is allowed that the lowest Tg is not more than 30° C.

The concrete examples of the soft polymer include an olefin type copolymer such as liquid polyethylene, polypropylene, poly-1-butene, ethylene-α-olefin copolymer, propylene-α-olefin copolymer, ethylene propylene diene copolymer (EPDM) and ethylene propylene styrene copolymer; an isobutylene type soft polymer such as polyisobutylene, isobutylene isoprene rubber and isobutylene styrene copolymer; a diene type soft polymer such as polybutadiene, polyisoprene, butadiene styrene random copolymer, isoprene styrene random copolymer, acrylonitrile butadiene copolymer, acrylonitrile butadiene styrene copolymer, butadiene styrene block copolymer, isoprene styrene block copolymer, styrene butadiene styrene block copolymer, isoprene styrene block copolymer and styrene isoprene styrene block copolymer; a silicon-containing soft polymer such as dimethyl polysiloxane, diphenyl polysiloxane and dihydroxy polysiloxane; a soft polymer composed of a α,β-unsaturated acid such as poly(butyl acrylate), poly(butyl methacrylate), poly(hydroxyethyl methacrylate), polyacrylamide, polyacrylonitrile and butyl acrylate styrene copolymer; a soft polymer composed of a unsaturated alcohol and amine, an acyl derivative thereof or acetal such as poly(vinyl alcohol), poly(vinyl acetate), poly(vinyl stearate) and vinylacetate styrene copolymer; an epoxy type soft polymer such as poly(ethyleneoxide), poly(propyleneoxide) and epichlorohydrin rubber; a fluorine-containing soft polymer such as vinylidene fluoride type rubber and ethylene tetrafluoride propylene rubber; and another soft polymer such as natural rubber, polypeptide, protein, a polyester type thermoplastic elastomer, a vinyl chloride type thermoplastic elastomer and a polyamide type thermoplastic elastomer. The soft polymers may be one having a crosslinking structure and one introduced with a functional group by a modification reaction.

In the above soft polymers, the diene type soft polymer is preferable, particularly a hydrogen added compound in which carbon-carbon unsaturated bond is hydrogenated, is superior in the rubber elasticity, mechanical strength, softness and dispersing ability.

(2) Alcoholic Compound

The alcoholic compound is a compound having at least one non-phenolic hydroxyl group, and preferably at least one hydroxyl group and at least one ether bond or ester bond. Concrete examples of such the compound include an alcoholic ether and ester compounds such as a poly-valent alcohol for example di or more-valent alcohol, preferably tri or more-valent alcohol, and more preferably poly-valent alcohol having 3 to 8 hydroxyl groups, in which one of the hydroxyl group is etherized or esterized.

As the di- or more-valent alcohol, for example, poly(ethylene glycol), glycerol, trimethylolpropane, pentaerythritol, diglycerol, triglycerol, dipentaerythritol, 1,6,7-trihydroxy-2,2-di(hydroxymethyl)-4-oxo-heptane, sorbitol, 2-methyl-1,6,7-trihydroxy-2-hydroxymethyl-4-oxo-heptane, 1,5,6-trihydroxy-3-oxo-hexanepentaerythritol and tris(2-hydroxyethyl)isocyanurate are cited, and the tri- or more-valent alcohol, particularly having 3 to 8 hydroxyl groups, are preferable. To obtain the alcoholic ester compound, glycerol, diglycerol and triglycerol are preferable, by which alcoholic ester compound containing α,β-diol can be synthesized.

Examples of such the alcoholic compound include a poly-valent alcoholic esterized compound such as glycerol monostearate, glycerol monolaurate, glycerol monobehenate, diglycerol monostearate, glycerol distearate, glycerol dilaurate, pentaerythritol monostearate, pentaerythritol monolaurate, pentaerythritol monobehenate, pentaerythritol distearate, pentaerythritol dilaurate, pentaerythritol tristearate and dipentaerythritol distearate; 3-(octyloxy)-1,2-propanediol, 3-(decyloxy)-1,2-propanediol, 3-(lauryloxy)-1,2-propanediol, 3-(4-nonylphenyloxy)-1,2-propanediol, 1,6-dihydroxy-2,2-di(hydroxymethyl)-7-(4-nonylphenyloxy)-4-oxo-eptane, an alcoholic ether compound obtained by reaction of a condensate of p-nonylphenyl ether with formaldehyde and glycidol, an alcoholic ether compound obtained by reaction of a condensate of p-octylphenyl ether with formaldehyde and glycidol, and an alcoholic ether compound obtained by reaction of a condensation of p-octylphenyl ether with dicyclopentadiene and glycidol are employable. These poly-valent alcoholic compounds are employed singly or in combination of two or more kinds thereof. The molecular weight of these poly-valent alcoholic compounds is usually from 500 to 2,000, preferably from 800 to 1,500 even though the molecular weight is not specifically limited.

(3) Organic or Inorganic Filler

As the organic filler, a usual organic polymer particle or a crosslinked organic polymer particle can be employed. For example, a particle or a crosslinked particle of a polyolefin such as polyethylene and polypropylene; a halogen-containing vinyl polymer such as poly(vinyl chloride) and poly(vinylidene chloride); a polymer derived from a α,β-unsaturated acid such as polyallylate and polymethacrylate; a polymer derived from a unsaturated alcohol such as poly(vinyl alcohol) and poly(vinyl acetate); a polymer derived from poly (ethylene oxide) or bisglycidol ether; an aromatic condensate polymer such as poly(phenylene oxide), polycarbonate and polysulfone; polyurethane; polyamide; polyester; aldehyde; aldehyde phenol type resin; and a natural polymer compound are employable.

As the inorganic filler, for example, a powder of a compound of an element of Group 1 of periodic table such as lithium fluoride and borax (sodium borate hydrate); a compound of an element of Group 2 such as magnesium carbonate, magnesium phosphate, calcium carbonate, strontium titanate and barium carbonate; a compound of an element of Group 4 such as titanium dioxide (titania) and titanium monoxide; a compound of an element Group 6 such as molybdenum dioxide and molybdenum trioxide; a compound of an element of Group 7 such as manganese chloride and manganese acetate; a compound of an element of Groups 8 to 10 such as cobalt chloride and cobalt acetate; a compound of an element of Group 11 such as cuprous iodide; a compound of an element of Group 12 such as zinc oxide and zinc acetate; a compound of an element of Group 13 such as aluminum oxide (alumina), aluminum fluoride and aluminosilicate (alumina silicate, kaolin and kaolinite): a compound of an element of Group 14 such as silicon oxide (silica and silica gel); and a natural mineral such as graphite, carbon and glass; carnallite, kainite, mica (mica and phlogopite) and pyrolusite are employable.

The adding amount of the compounds of (1) to (3) is decided by the combination of the polymer having the alicyclic structure and the compound to be added. The glass transition point and the transparency of the composition is largely lowered when the adding amount is too large in general. When the adding amount is too small, white turbid tends to occur under the high temperature and high humid condition so that the composition becomes unsuitable to use for the optical material. The adding amount is usually from 0.01 to 10, preferably from 0.02 to 5, particularly preferably from 0.05 to 2, parts by weight to 100 parts by weight of the polymer having the alicyclic structure. When the adding amount is too small, the effect for preventing occurrence of the white turbid under the high temperature and high humidity condition cannot be obtained, and when the adding amount is too large, the heat resistivity and the transparency of the molded product are lowered.

<Method of Preparing Resin Composition>

The method of preparing the resin composition according to the present invention will be described in the following.

The resin composition according to the present invention is preferable that plasticizers, antioxidants and other additives which are normally added to resins prior to the molding step, may be added.

A preferable method of preparing the resin composition according to the present invention is a kneading process or a solvent removal method in which the mixture is dissolved in a solvent and the composition is obtained by drying, but the kneading process is more preferable. The kneading process may be those processes used in blending normal resins. Rolls, Banbury mixers, biaxial kneaders, and kneader ruder may be used but the Banbury mixer, biaxial mixers, and kneader ruder are preferable. In order to prevent oxidation of the resin, a device in which kneading is possible in a sealed system is used and more preferably, the kneading process is performed in an inactive gas such as nitrogen or argon.

<Method of Production of Objective Lens>

Method of preparing objective lens is described.

The production method of the objective lens of this invention includes preparation of resin composition which may be a resin only or mixture of resin and additives, and a process of molding the prepared resin composition.

Method of molding process of the resin composition is described.

The molded product of the thermoplastic composite material is obtained by molding the foregoing resin composition. A melt-molding method is preferable for obtaining the formed product superior in the low birefringence, mechanical strength and dimension accuracy. For melt-molding, a press molding apparatus, an extrusion molding apparatus and an injection molding apparatus, each available on the market, are applicable and the injection molding method is preferable from the viewpoint of the molding property and the production efficiency.

The molding condition is suitably decided according to the purpose of the use and the molding method. The temperature of the resin composition (one containing only a resin or a mixture of the resin and the additive) is, for example, preferably from 150° C. to 400° C., more preferably from 200° C. to 350° C., and particularly preferably from 200° C. to 330° C. from the viewpoint for preventing occurrence of the sink and the distortion of the molded product by giving the suitable fluidity on the occasion of the molding and further preventing the occurrence of the silver streak caused by the thermal decomposition and yellow coloring of the molded product.

The molded resin is taken from the mold and is subjected to thermal processing at a temperature between Tg −45° C. and Tg −15° C. for 12 to 168 hours after the molding process, wherein Tg is a glass transfer temperature of the copolymer according to this invention. The thermal processing is conducted in such a way that the molded lenses are put into an oven and heated in predetermined condition of temperature, humidity and temperature.

The objective lens may be composed of a single lens or a plurality of lenses. The objective lens of this invention is an optical element arranged at the closest position to a recording medium among optical elements provided between a light source and the recording medium. When a plurality of optical elements including an optical element arranged at the closest position to a recording medium is provided to be driven integrally, the plurality of optical elements is regarded as a single objective lens.

<Optical Pickup Apparatus>

The optical pickup apparatus provided with an objective lens according to this invention is described.

As is shown in the FIGURE, the optical pickup apparatus 30 has a semiconductor laser oscillator 32 as the light sources. The semiconductor laser oscillator 32 emits blue laser (blue violet) of a specific wavelength of from 380 to 420 nm, for example, 405 nm for a BD. Collimator 33, beam splitter 34, ¼ wave length plate 35, aperture 36 and objective lens 37 are arranged in sequence on the optical axis of blue violet light emitted from the semiconductor laser oscillator 32 at a direction away from the semiconductor laser oscillator 32.

Sensor lens group 38 including two lenses and sensor 39 are arranged in sequence in a direction orthogonal to the blue violet optical axis at a position closed to beam splitter 34.

The objective lens 37 is arranged at a position opposing to high density optical disc D (optical disc for BD), and blue violet light emitted from the semiconductor laser oscillator 32 is condensed on a surface of the optical disk D. The objective lens 37 has two dimensional actuator 40, and the objective lens moves freely on the optical axis according to action of the two dimensional actuator.

One or both surface of the objective lens may be processed to have fine shape such as concentric circular steps. The objective lens may have an aspheric surface on one side though objective lens 37 has aspheric surface on both sides in the FIGURE.

Function of the optical pickup apparatus 30 will be described.

Blue violet ray is emitted from the semiconductor laser oscillator 32 in recording the information to the CD 30 or playback of the information in the CD 30. The emitted ray is collimated to infinite parallel ray through collimator 33, then transmits through beam splitter and ¼ wave length plate 35. Blue violet ray further forms a condensed light spot on information recording surface $D_2$ through protective substrate $D_1$ of the optical disc D after transmission through aperture 36 and objective lens 37.

The blue violet ray formed the condensed light spot is modulated by information bit at information recording surface $D_2$ of the optical disc D and is reflected by the information recording surface $D_2$. The reflected light goes through objective lens 37 and aperture 37 in sequence, and its polarization direction is changed by ¼ wave length plate 35, and is reflected by beam splitter 34. Astigmatism is given to the reflected light during going through sensor lens group 38, accepted by sensor 39 and converted to electric signal via photoelectric conversion by sensor 39.

Thus recording the information to the CD 30 or playback of the information in the CD 30 can be performed by repeating the operation.

EXAMPLE

The present invention is described concretely with reference to examples.

<Production of Sample 9>

To a cyclic olefin copolymer of tetracyclo[$4.4.0.1^{2.5}.1^{7.10}$]-3-dodecene and ethylene, 1.0% by weight of HALS, bis-[2,2,6,6-tetramethyl-4-piperidinyl]sebacate was added. The mixture was kneaded at 220° C., and pellets were made by means of extruder to obtain resin composition. Glass transition temperature of the copolymer was 130° C.

An objective lens corresponding to the objective lens 37 shown in the FIGURE was produced by injection molding employing the resin composition at 260° C. of cylinder temperature. The lens had thickness of 2 mm in optical axis direction and diameter of 5 mm. The lens is referred to Sample 9.

<Evaluation>

Lenses of Sample 9 were subjected to thermal processing in a condition of temperature and time shown in Table to obtain processed Samples 1 to 8 and 10. The values of temperature condition "Tg—temperature (° C.)" in Table show temperature difference from Tg.

Aberration of samples were measure by employing interferometer Zygyo DVD 400™ Pro (wave length of 405 nm) by radiating blue laser with power of 25 W at 85° C. environmental condition. Aberration of unprocessed Sample 9 and processed Samples 1 to 8 and 10 were measured. The difference of the aberration of processed Samples 1 to 8 and from that of unprocessed Sample 9 in terms of Aberration Variation rms λ are listed in the Table.

TABLE 1

| Sample No. | Processing condition | | Aberration Variation (rms λ) | |
| --- | --- | --- | --- | --- |
| | Tg − temperature (° C.) | Time (hours) | | |
| 1 | 45 | 1008 | 0.013 | Comparative |
| 2 | 45 | 168 | 0.008 | Invention |
| 3 | 35 | 840 | 0.015 | Comparative |

TABLE 1-continued

| | Processing condition | | | |
|---|---|---|---|---|
| Sample No. | Tg - temperature (° C.) | Time (hours) | Aberration Variation (rms λ) | |
| 4 | 35 | 72 | 0.007 | Invention |
| 5 | 25 | 504 | 0.015 | Comparative |
| 6 | 25 | 48 | 0.005 | Invention |
| 7 | 15 | 168 | 0.010 | Invention |
| 8 | 15 | 12 | 0.006 | Invention |
| 9 | — | — | 0.020 | Comparative |
| 10 | 55 | 1008 | 0.017 | Comparative |

Table 1 demonstrates that Aberration Variation of samples 1, 3, 5, 9 and 10 which were not processed or processed in a condition fallen outside of this invention excess 0.01 rms λ, and the Samples 2, 4, and 6-8 processed according to this invention have good Aberration Variation within 0.01 rms λ. In conclusion stability against light by blue laser radiation is improved by this invention.

The invention claimed is:

1. A production method of an objective lens for optical pickup apparatus having numerical aperture NA of image side of 0.80 to 0.90, comprising steps of molding resin composition containing copolymer of α-olefin and a cyclic olefin represented by Formula (I) or (II) to form lens shape, and thermally processing the molded product under a condition at a temperature between Tg −45° C. and Tg −15° C. for 12 to 168 hours,

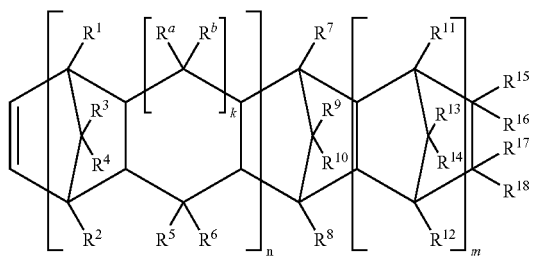

(I)

in the formula, n is 0 or 1, m is 0 or a positive integer, and k is 0 or 1, $R^1$ to $R^{18}$ and $R^a$ and $R^b$ independently represent a hydrogen atom, a halogen atom or a hydrocarbon group,

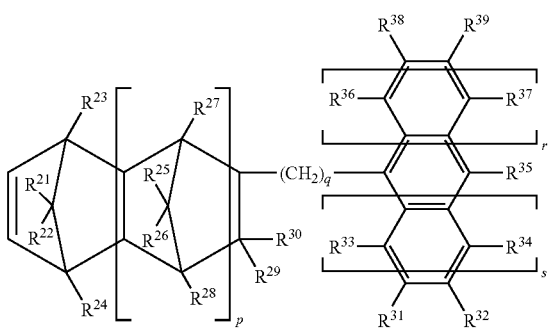

(II)

in the formula (II), p and q independently represent 0 or a positive integer and r and s independently represent 0, 1 or 2, and $R^{21}$ to $R^{39}$ independently represent a hydrogen atom, a halogen atom, a hydrocarbon group or an alkoxy group.

2. A production method of claim 1, wherein the cyclic olefin is represented by Formula (I).

3. A production method of claim 1, wherein the cyclic olefin is tetracyclo[4.4.0.1$^{2.5}$.1$^{7.10}$]-3-dodecene derivative.

4. A production method of claim 3, wherein the cyclic olefin is tetracyclo[4.4.0.1$^{2.5}$.1$^{7.10}$]-3-dodecene.

5. A production method of claim 1, wherein the α-olefin has 2-20 carbon atoms.

6. A production method of claim 5, wherein the α-olefin is ethylene, propylene, 1-butene, 1-pentene, 1-hexene, 1-octene, 1-decene, 1-dodecene, 1-tetradecene, 1-hexadecene, 1-octadecene, 1-eicocene, 4-methyl-1-pentene, 3-methyl-1-pentene and 3-methyl-1-butene.

7. A production method of claim 6, wherein the α-olefin is ethylene.

8. A production method of claim 1, wherein a content of α-olefin monomer in the copolymer is 20 weight % or more.

9. A production method of claim 8, wherein content of α-olefin monomer in the copolymer is between 25% and 90%.

10. A production method of claim 1, wherein a glass transition temperature (Tg) of the copolymer is 80-250° C.

11. A production method of claim 10, wherein a glass transition temperature (Tg) of the copolymer is 90-220° C.

12. A production method of claim 11, wherein a glass transition temperature (Tg) of the copolymer is 100-200° C.

13. A production method of claim 1, wherein a number average molecular weight Mn of the copolymer is 10,000-1,000,000.

14. A production method of claim 13, wherein a number average molecular weight Mn of the copolymer is 20,000-500,000.

15. A production method of claim 14, wherein a number average molecular weight Mn of the copolymer is 50,000-300,000.

16. A production method of claim 1, wherein Mw/Mn of the copolymer measured with the polystyrene conversion value is 2.0 or less, wherein Mn is a number average molecular weight and Mw is a weight average molecular weight.

17. A production method of claim 1, wherein the copolymer is a noncrystalline polymer.

18. A production method of claim 1, wherein the copolymer comprises a hindered amine light stabilizer.

19. An objective lens produced by a method of claim 1.

20. An optical pickup apparatus comprising a lens produced by a method of claim 1 and a light source having a wave length of 380 to 420 nm.

* * * * *